United States Patent
Hayes (12)

(10) Patent No.: US 6,500,904 B1
(45) Date of Patent: Dec. 31, 2002

(54) HIGH MOLECULAR WEIGHT POLY(IMIDE)S AND METHODS OF SYNTHESIS THEREOF

(75) Inventor: Robert F. Hayes, Malta, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/682,960

(22) Filed: Nov. 2, 2001

(51) Int. Cl.[7] .................. C08L 77/00; C08G 73/00; C08G 69/28
(52) U.S. Cl. ............... 525/419; 525/420; 525/432; 525/436; 528/125; 528/126; 528/128; 528/170; 528/171; 528/172; 528/173; 528/174; 528/176; 528/183; 528/185; 528/188; 528/220; 528/229; 528/350; 528/351; 528/353
(58) Field of Search ................. 528/170, 353, 528/125, 126, 128, 171, 172, 173, 174, 176, 183, 188, 185, 220, 229, 350, 351; 525/419, 420, 432, 436

(56) References Cited

U.S. PATENT DOCUMENTS

| | | | |
|---|---|---|---|
| 3,803,085 | 4/1974 | Takehoshi et al. | 260/46.5 E |
| 3,814,869 | 6/1974 | De Luca | 179/175 |
| 3,847,867 | 11/1974 | Heath et al. | 260/47 CP |
| 3,850,885 | 11/1974 | Takekoshi et al. | 260/47 CZ |
| 3,852,242 | 12/1974 | White | 260/47 CZ |
| 3,855,178 | 12/1974 | White et al. | 260/45.7 S |
| 3,905,942 | 9/1975 | Takekoshi et al. | 260/47 CP |
| 3,972,902 | 8/1976 | Heath et al. | 260/346.3 |
| 3,983,093 | 9/1976 | Williams, III et al. | 260/47 CP |
| 3,998,786 | * 12/1976 | D'Alelio | 524/741 |
| 4,011,198 | 3/1977 | Takekoshi et al. | 260/47 CP |
| 4,064,113 | * 12/1977 | D'Alelio | 524/108 |
| 4,443,591 | 4/1984 | Schmidt et al. | 528/128 |
| 4,455,410 | 6/1984 | Giles et al. | 525/436 |
| 4,550,156 | * 10/1985 | Gallagher | 528/125 |
| 5,189,115 | * 2/1993 | Melquist | 525/420 |
| 5,262,516 | * 11/1993 | Dellacoletta | 528/125 |

* cited by examiner

Primary Examiner—P. Hampton-Hightower

(57) ABSTRACT

A method for the synthesis of high molecular weight poly (imide)s comprising coupling poly(imide) precursors having complementary functional groups and a weight average molecular weight of less than about 50,000 Daltons to form high molecular weight poly (imides)s having a weight average molecular weight greater than 50,000 Daltons.

22 Claims, No Drawings

HIGH MOLECULAR WEIGHT POLY(IMIDE)S AND METHODS OF SYNTHESIS THEREOF

BACKGROUND OF INVENTION

The present invention relates generally to poly(imide)s and, more particularly, to high molecular weight poly (imide)s and methods of synthesis thereof.

Specialized applications of poly(imide)s capitalize on their unique chemical and physical properties, such as chemical resistance, selective gas permeability, good thermo-oxidative stability, excellent adhesion to metals, high heat performance, and mechanical strength. Poly (imide)s are particularly useful in certain specialized applications, for example in textiles, membranes with selective gas permeability, and in aerospace, aircraft, automotive, and related industries. Manufacture of certain of these articles (particularly selective gas permeable membranes) depends on the solubility and solution properties of the poly(imide). Accordingly, manufacture is preferably being based on solutions having high viscosities and low solid content. Although poly(imide)s having molecular weights of up to 50,000 Daltons are presently used, poly(imide)s having very high molecular weights, (especially greater than 100,000 Daltons) would be even more desirable, as high molecular weight poly(imide)s have high intrinsic viscosities, generally greater than about 0.75 deciliters per gram in the condensed (molten) phase. However, because of these very high viscosities, synthesis and isolation of high molecular weight poly(imide)s using techniques and equipment developed for use with lower molecular weight poly (imide)s is prohibitively difficult.

SUMMARY OF THE INVENTION

The above-described drawbacks and disadvantages are overcome by a method for the synthesis of a high molecular weight poly(imide) comprising coupling a first poly(imide) precursor having first a functional group and a weight average molecular weight less than about 50,000 Dalton with a second poly(imide) precursor having a second functional group and a weight average molecular weight less than about 50,000 Daltons to form a high molecular weight poly(imide) having a weight average molecular weight greater than 50,000 Daltons.

In an alternate embodiment, a method for the synthesis of a high molecular weight poly (imide) comprises coupling an amine-functionalized precursor poly(imide) having a weight average molecular weight of less than about 50,000 Daltons with an anhydride-functionalized precursor poly(imide) having a weight average molecular weight of less than about 50,000 Daltons to provide a poly(imide) having a molecular weight of greater than 50,000 Daltons. The above-described and other features and advantages will be appreciated and understood by those skilled in the art from the following detailed description and appended claims.

DETAILED DESCRIPTION

High molecular weight thermoplastic poly(imide)s are available from the coupling of lower molecular weight functionalized precursor poly(imide)s. As used herein,"high molecular weight poly(imide)s" refers to poly(imide)s having weight average molecular weights ($M_w$) of greater than 50,000 Daltons, as measured by gel permeation chromatography/laser light scattering/differential viscometry. The method comprises coupling precursor poly(imide)s having complementary functional groups having a weight average molecular weight of less than about 50,000 Daltons. Preferably the method comprises coupling an amine-functionalized precursor poly(imide) having a weight average molecular weight of less than about 50,000 Daltons with an anhydride-functionalized precursor poly(imide) having a weight average molecular weight of less than about 50,000 Daltons. The resultant poly(imide)s have weight average molecular weights greater than 50,000 Daltons, preferably greater than about 60,000 Daltons, more preferably greater than about 75,000 Daltons, even more preferably greater than about 100,000 Daltons, and most preferably greater than about 120,000 Daltons.

The functionalized precursor poly(imide)s as well as the high molecular weight poly (imide) are characterized by the presence of an imide group having the general formula —C(O)NRC(O)—. The imide group can be part of either an acyclic or cyclic system within the polymer. Preferred classes of precursor poly(imide)s are aromatic poly(imide)s, characterized by the presence of both an aromatic group and an imide group; poly(amidimide)s, characterized by the presence of both an imide group and an amide group (—C(O)NH—); and poly(etherimide)s, characterized by the presence of both an ether group and an imide group. Useful precursor poly(imide)s include those known in the art which are melt processable, such as those disclosed in U.S. Pat. Nos. 3,803,085 and 3,905,942.

Useful precursor polyimides have the general formula (I)

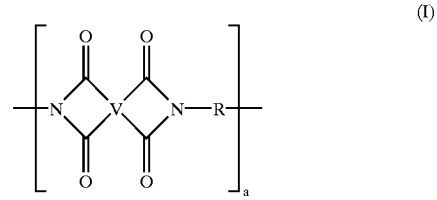

(I)

wherein V is a tetravalent linker without limitation, as long as the linker does not impede synthesis or use of the polyimide, and a is more than 1, typically from about 4 to about 1000 or more, and more preferably from about 4 to about 200. Suitable linkers include but are not limited to: (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having 1 to about 30 carbon atoms; or combinations thereof. Suitable substitutions and/or linkers include, but are not limited to, ethers, epoxides, amides, esters, and combinations thereof. Preferred linkers include but are not limited to tetravalent aromatic radicals of formula (II), such as

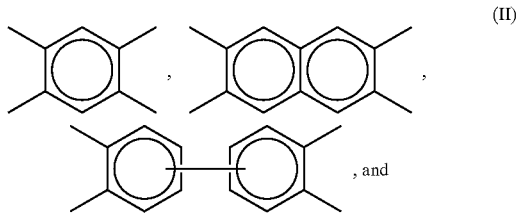

(II)

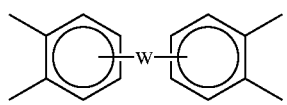

wherein W is a divalent moiety selected from the group consisting of —O—, —S—, —C(O)—, —SO$_2$—, C$_y$H$_{2y}$— (y being an integer from 1 to 5), and halogenated derivatives thereof, including perfluoroalkylene groups, or a group of the formula —O—Z—O— wherein the divalent bonds of the —O— or the —O—Z—O—group are in the 3,3', 3,4', 4,3', or the 4,4' positions, and wherein Z includes, but is not limited, to divalent radicals of formula (III).

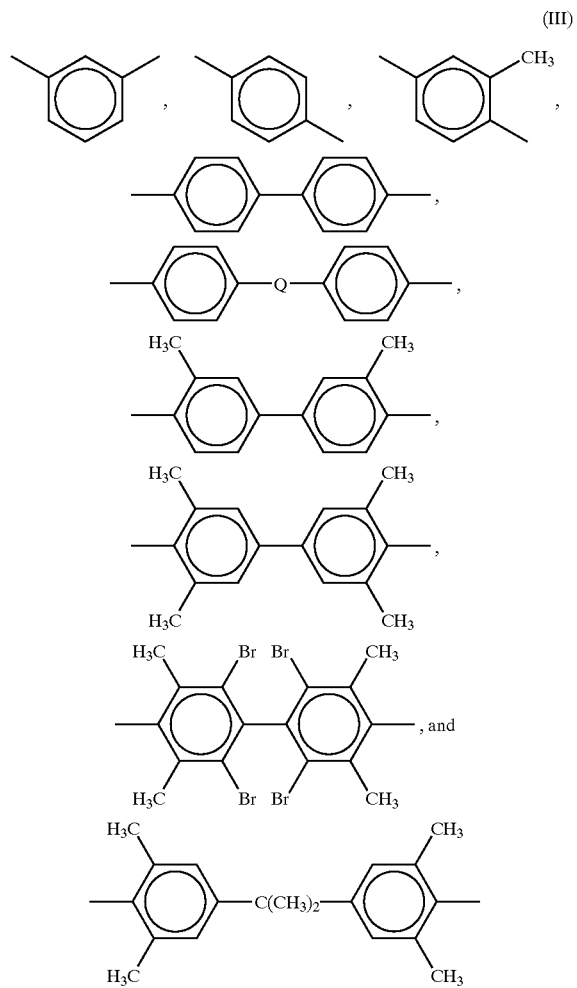

R in formula (I) includes but is not limited to substituted or unsubstituted divalent organic radicals such as: (a) aromatic hydrocarbon radicals having about 2 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (IV)

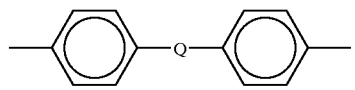

wherein Q includes but is not limited to divalent a divalent moiety selected from the group consisting of —O—, —S—, —C(O)—, —SO$_2$—, C$_y$H$_{2y}$— (y being an integer from 1 to 5), and halogenated derivatives thereof, including perfluoroalkylene groups.

Preferred poly(etherimide) precursors resins comprise more than 1, typically about 4 to about 85 or more, and more preferably about 4 to about 75 structural units, of the formula (V)

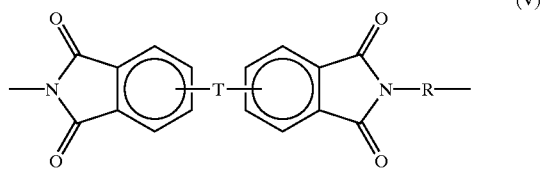

wherein T is —O— or a group of the formula —O—Z—O—wherein the divalent bonds of the —O— or the —O—Z—O— group are in the 3,3', 3,4', 4,3', or the 4,4' positions, and wherein Z includes, but is not limited, to divalent radicals of formula (III) as defined above.

In one embodiment, the polyetherimide may be a copolymer which, in addition to the etherimide units described above, further contains polyimide structural units of the formula (VI)

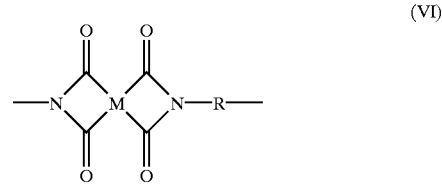

wherein R is as previously defined for formula (I) and M includes, but is not limited to, radicals of formula (VII).

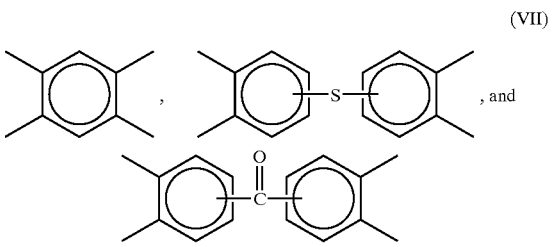

The polyetherimide can be prepared by any of the methods well known to those skilled in the art, including the reaction of an aromatic bis(ether anhydride) of the formula (VIII)

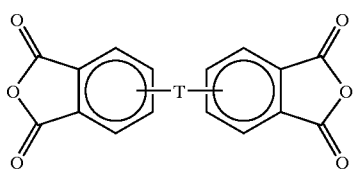

(VIII)

with an organic diamine of the formula (IX) $H_2N—R—NH_2$ wherein T and R are defined as described above in formulas (I) and (IV).

Examples of specific aromatic bis(ether anhydride)s and organic diamines are disclosed, for example, in U.S. Pat. Nos. 3,972,902 and 4,455,410. Illustrative examples of aromatic bis(ether anhydride)s of formula (VII) include: 2,2-bis[4-(3,4-dicarboxyphenoxy)phenyl] propane dianhydride; 4,4'-bis(3,4-dicarboxyphenoxy)diphenyl ether dianhydride; 4,4'-bis (3,4-dicarboxyphenoxy)diphenyl sulfide dianhydride; 4,4'-bis(3,4-dicarboxyphenoxy) benzophenone dianhydride; 4,4'-bis(3,4-dicarboxyphenoxy)diphenyl sulfone dianhydride; 2,2-bis[4-(2,3-dicarboxyphenoxy)phenyl] propane dianhydride; 4,4'-bis(2,3-dicarboxyphenoxy) diphenyl ether dianhydride; 4,4'-bis(2,3-dicarboxyphenoxy) diphenyl sulfide dianhydride; 4,4'-bis(2,3-dicarboxyphenoxy)benzophenone dianhydride; 4,4'-bis (2,3-dicarboxyphenoxy)diphenyl sulfone dianhydride; 4-(2, 3-dicarboxyphenoxy)-4'-(3,4-dicarboxyphenoxy)diphenyl-2,2-propane dianhydride; 4-(2,3-dicarboxyphenoxy)-4'-(3, 4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures thereof.

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent. A preferred class of aromatic bis(ether anhydride)s included by formula (VIII) above includes, but is not limited to, compounds wherein T is of the formula (X)

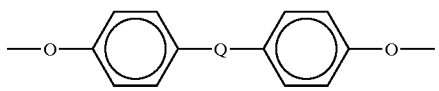

(X)

and the ether linkages, for example, are preferably in the 3,3', 3,4 ', 4,3', or 4,4' positions, and mixtures thereof, and where Q is as defined above.

Any diamino compound may be employed in the method of this invention. Examples of suitable compounds are ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,1 2-dodecanediamine, 1,1 8-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'dimethoxybenzidine, 1,5-diaminonaphthalene, bis(4-aminophenyl) methane, bis (2-chloro-4-amino-3,5-diethylphenyl) methane, bis(4-aminophenyl) propane, 2,4-bis(b-amino-t-butyl) toluene, bis (p-b-amino-t-butylphenyl) ether, bis(p-b-methyl-o-aminophenyl) benzene, bis(p-b-methyl-o-aminopentyl) benzene, 1,3-diamino-4-isopropylbenzene, bis(4-aminophenyl) sulfide, bis (4-aminophenyl) sulfone, bis(4-aminophenyl) ether and 1,3-bis(3-aminopropyl) tetramethyidisiloxane. Mixtures of these compounds may also be present. The preferred diamino compounds are aromatic diamines, especially m- and p-phenylenediamine and mixtures thereof.

In a particularly preferred embodiment, the polyetherimide comprises structural units according to formula (IV) wherein each R is independently p-phenylene or m-phenylene or a mixture thereof and T is a divalent radical of the formula (XI)

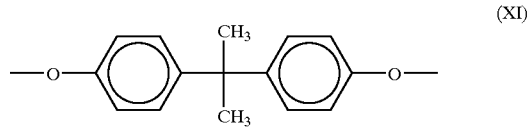

(XI)

Included among the many methods of making the polyimides, particularly polyetherimides, are those disclosed in U.S. Pat. Nos. 3,847,867, 3,814,869, 3,850,885, 3,852,242, 3,855,178, 3,983,093, and 4,443,591. These patents are presented here for the purpose of teaching, by way of illustration, general and specific methods for preparing polyimides.

In general, the reactions can be carried out employing well-known solvents, e.g., o-dichlorobenzene, m-cresol/toluene and the like, to effect a reaction between the anhydride of formula (VIII) and the diamine of formula (IX), at temperatures of about 100° C. to about 250° C. Alternatively, the polyetherimide can be prepared by melt polymerization of aromatic bis(ether anhydride)s (VIII) and diamines (IX) by heating a mixture of the starting materials to elevated temperatures with concurrent stirring. Generally, melt polymerizations employ temperatures of about 200° C. to about 400° C. Chain stoppers and branching agents may also be employed in the reaction. When polyetherimide/polyimide copolymers are employed, a dianhydride, such as pyromellitic anhydride, is used in combination with the bis(ether anhydride).

Preferably, the precursor poly(imide)s have a weight average molecular weight ($M_W$) of from 3,400 to 49,000 grams per mole ("g/mole"), as measured by gel permeation chromatography/laser light scattering. Such poly(imide)s typically have intrinsic viscosities greater than about 0.2 deciliters per gram, preferably about 0.35 to about 0.7 deciliters per gram measured in m-cresol at 25° C.

In order to function as precursor poly(imide)s, the above-described polymers must be functionalized with complementary functional groups, that is, functional groups which will allow reaction between the precursor polyimides to form the higher molecular weight products. The above described polymers may be functionalized in one of two ways depending upon the desired functional group. If the desired functional group is the anhydride or amine used to make the polymer itself then producing the precursor poly (imide) merely requires including a molar excess of anhydride or amine in the polymerization reaction. If the desired functional group is other than the anhydride or amine employed in the polymer synthesis then an end-capping agent must employed. Use of endcapping agents is well known in the art. End-capping agents generally comprise either an anhydride or amine functionality in addition to the desired functional group. Choice of the end-capping agent may affect the resulting properties of the high molecular weight poly (imide). Useful complementary functional groups include all functional groups capable of reacting with each other so as to form at least one bond between the precursors thereby coupling the precursor and resulting in a high molecular weight poly(imide). Useful sets of complementary functional groups include, but are not limited to, esters and aliphatic amines, carboxylic acids and amines, acid chlorides and amines, anhydrides and amines, electron rich dienes and dienophiles, and aromatic ring systems containing cyclobutane and functional groups containing a triple bond. A preferred set of complementary functional groups is amines and anhydrides.

Esters useful as a complementary functional group include all esters having four or less carbons, namely methyl, ethyl, propyl and butyl esters. As is readily understood by one of ordinary skill in the art, methyl esters will react more quickly with a given aliphatic amine than a larger ester such as butyl ester. Additionally, the coupling of an ester with an amine produces the alcohol corresponding to the ester as a side product. The lower alcohols, such as methanol, have a lower boiling point and are easier to remove.

Amines useful as a complementary functional group with esters are aliphatic and may be primary or secondary aliphatic amines. There are no particular limitations on the identity of the aliphatic amine.

Precursors poly(imide)s with carboxylic acid or acid chloride functional groups may be obtained from poly (imide)s with ester functionality by any method known in the art. Precursor poly(imide)s with carboxylic acid or acid chloride functional groups may be coupled with precursor poly(imide)s with amine functional groups. In this case the amine may be a primary or secondary aliphatic amine or an aromatic amine.

Precursor poly(imide)s with electron rich diene functional groups may be coupled with precursor poly(imide)s with dienophile type functional groups utilizing the Diels-Alder reaction. Useful electron rich dienes include, but are not limited to, anthracene and furfuryl. Useful dienophiles include but are not limited to maleic anhydride and electron poor alkenes and alkynes. Notably, the coupling of precursor poly(imide)s using a Diels-Alder reaction does not yield any side products.

Precursor poly(imide)s comprising a functional group containing an aromatic ring system and cyclobutane may be coupled with a precursor poly(imide) comprising a functional group containing a triple bond which may be terminal or non-terminal. Useful aromatic ring systems with cyclobutane are those in which the cyclobutane is fused between two aromatic rings. Aromatic rings are herein defined as including heteroaromatic rings and ring systems such as pyridine, furan, pyrrole, thiophene, pyrazole, quinoline and fused ring systems such as naphthalene and anthracene. The cyclobutane ring, a strained ring system, reacts with the triple bond to form a six membered aromatic ring without the production of side products.

In a preferred embodiment a first precursor poly(imide) comprises at least one amine group, preferably a terminal (end-capping) amine group. Exemplary amine functionalized precursor polyetherimides may be prepared from the reaction of an aromatic bis(ether anhydride) with an organic diamine in which the diamine is present in a molar excess of at least about 2.0 mol%. Preferred amines for synthesis of amine-endcapped poly(etherimide) include, but are not limited to, aliphatic diamines (particularly hexamethylene diamine), gamma-aminopropyl polydimethylsiloxane, m-phenylenediamine, p-phenylenediamine, diethyltoluene diamine or mixtures comprising at least one of the foregoing amines.

A second precursor poly(imide) comprises anhydride groups, preferably terminal anhydride groups. Poly(imide)s endcapped with anhydride groups are available by synthesis of poly(imide)s as described above, using a molar excess of anhydride relative to amine of at least about 2.0 mol%. Alternative methods for synthesis of anhydride-endcapped poly (imides) are also known, being disclosed, for example, in U.S. Pat. Nos. 3,972,902 and 4,011,198. Preferred anhydrides for the synthesis of anhydride-endcapped poly (imide)s include, but are not limited to, aromatic dianhydrides, fluorinated aromatic dianhydrides, pyromellitic dianhydride, oxydiphthalic anhydride, bisphenol-A dianhydride, and mixtures comprising at least one of the foregoing anhydrides.

The degree of endcapping is adjustable by varying amount of excess amine or anhydride. Such amounts are readily determined by one of ordinary skill in the art. Molar excesses in the range from about 2.0 mol% to about 6.0 mol% (based on moles of the other reactant) are generally effective. Under these conditions the poly(imide) resin has between 95 and 150 micro equivalents per gram of acid titratable groups (in the case of amine endcapping, using titration of a chloroform solution with a glacial acetic acid solution of 33% hydrobromic acid ), or base titratable groups (in the case of anhydride endcapping, using titration of a chloroform solution with a 0.1 molar sodium ethoxide solution in ethanol).

Coupling of the precursors in solution is preferred, as it decreases the viscosity of the system and permits uniform precursor mixing thereby resulting in a more uniform reaction. Use of an appropriate solvent can also facilitate the coupling reaction itself. Suitable solvents are non-reactive, and capable of dissolving the precursor poly(imide)s. Exemplary solvents for the reaction of amine- and anhydride-functionalized poly(etherimide)s include but are not limited to o-dichlorobenzene, trichlorobenzene, N-methylpiperazine (NMP), and mixtures thereof, with o-dichlorobenzene and N-methylpiperazine being preferred. Where water is produced as a reaction by-product, coupling is preferably performed at temperatures above about 100° C., preferably in the range of about 100° C. to about 350° C., most preferably in the range of about 100° C. to about 180° C. to facilitate the removal of the formed water. However, the reaction temperature preferably is below the boiling point of the solvent. Alternately, chemical drying agents including anhydrides such as acetic anhydride and carbodiimides such as dicyclohexylcarbodiimide can also be used to remove the by-product water. Progress of the reaction may be monitored by measurement of the change in molecular weight and/or intrinsic viscosity (IV).

Coupling may also be performed using melt-mixing techniques, although solution coupling is preferred, because the high molecular weight products made from the precursors have a high viscosity, which renders melt-mixing difficult.

The molecular weight of the product high molecular weight poly(imide) may be determined by direct measurement of the molecular weight. Molecular weight may also be inferred from measurement of the intrinsic viscosity, or, where the percent of endcapping of at least one of the precursors is known, by monitoring the change in concentration of the endcapping by infrared spectroscopy or titration, for example.

The high molecular weight poly(imide) may be isolated by conventional techniques, such as solvent evaporation or anti-solvent precipitation. However, isolation of the high molecular weight poly(imide)s, as well as fabrication of articles from the pure, molten poly(imide) can be difficult using present techniques and equipment, which have been developed for use with lower molecular weight polymers. It is therefore preferred to use the formed poly(imide) directly, delaying removal of the solvent by evaporation or anti-solvent precipitation until during and/or after fabrication of the final article.

All patents cited are incorporated herein by reference.

The following examples are given by way of illustration, and not by way of limitation.

EXAMPLES

Synthesis of a high molecular weight poly(etherimide) is illustrated by the following example. An amine functionalized poly(etherimide) was synthesized by reaction of a 3.0% molar excess of meta-phenylene diamine relative to bis-phenol A dianhydride in ortho-dichlorobenzene, at 120° C. for two hours. A small quantity of phthalic anhydride (1.1% molar equivalent of the bis-phenol A dianhydride functional groups) was also added to limit the ultimate molecular weight of the final polymer. The amine functionalized poly(etherimide) was isolated by evaporation of the solvent, and found to have a number average molecular weight of 15,100 Daltons and weight average molecular weight of 25,500 Daltons as measured by gel permeation chromatography/laser light scattering/differential viscometry.

An anhydride functionalized poly(etherimide) was synthesized and isolated under similar conditions, using a 2.7% molar excess of bis-phenol A dianhydride relative to m-phenylene diamine. A small quantity of phthalic anhydride (1.1% molar equivalent of the bis-phenol A dianhydride functional groups) was also added to limit the ultimate molecular weight of the final polymer. The anhydride functionalized poly(etherimide) had a number average molecular weight of 20,200 Daltons and weight average molecular weight of 42,500 Daltons as measured by gel permeation chromatography/laser light scattering/differential viscometry.

A mixture of the amine functionalized poly(etherimide) and anhydride-functionalized poly(etherimide) (weight ratio of 43.7: 56.3 respectively) was coupled by dissolution of the precursors in ortho-dichlorobenzene and stirring at about 120° C. for about four hours with azeotropic removal of water. The resulting product was isolated by evaporation of the solvent. The product polymer had a 0.006% molar excess of anhydride relative to amine, a number average molecular weight of 48,200 Daltons, and weight average molecular weight of 104,500 Daltons as measured by gel permeation chromatography/laser light scattering/differential viscometry. These results are shown in tabular form below:

|  | Number Average Molecular Weight | Weight Average Molecular Weight |
| --- | --- | --- |
| Amine-functionalized poly-(etherimide) | 15,100 | 25,500 |
| Anhydride-functionalized poly-(etherimide) | 20,200 | 42,500 |
| Product poly(etherimide) | 48,200 | 104,500 |

Although the above example presents only one of the many polyetherimides which can be made in accordance with this method, it should be understood that the method is also suitable for the manufacture and employment of high molecular weight thermoplastic poly (imide)s broadly set forth in the description preceding these examples. This method of manufacture of high molecular weight poly(imide)s provide high viscosity, low solid content solutions, which find particular utility in the manufacture of high strength films (including membranes), fibers, and coatings.

It is to be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A method for making high molecular weight poly(imide)s, comprising:

coupling a first poly(imide) precursor having a first functional group and a weight average molecular weight less than about 50,000 Daltons with a second poly(imide) precursor having a second functional group and weight average molecular weight less than about 50,000 Daltons to form a high molecular weight poly(imide) having a weight average molecular weight greater than about 50,000 Daltons.

2. The method of claim 1, wherein the weight average molecular weight of the high molecular weight poly(imide)s is greater than about 60,000 Daltons.

3. The method of claim 1, wherein the weight average molecular weight of the high molecular weight poly(imide)s is greater than about 80,000 Daltons.

4. The method of claim 1, wherein the weight average molecular weight of the high molecular weight poly(imide)s is greater than about 100,000 Daltons.

5. The method of claim 1, wherein the weight average molecular weight of the high molecular weight poly(imide)s is greater than about 120,000 Daltons.

6. The method of claim 1, wherein the high molecular weight poly(imide) comprises structural units of the formula (I)

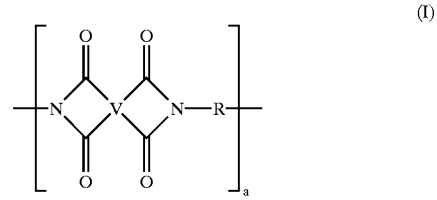

wherein V is a tetravalent linker selected from the group consisting of (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having 1 to about 30 carbon atoms, and (c) combinations thereof, wherein the substitutions are ethers, epoxides, amides, esters, or combinations thereof;

R is a substituted or unsubstituted divalent organic radical selected from the group consisting of (a) aromatic hydrocarbon radicals having about 6 to about 20 carbon atoms or halogenated derivatives thereof, (b) straight or branched chain alkylene radicals having about 2 to about 20 carbon atoms; (c) cycloalkylene radicals having about 3 to about 20 carbon atoms, and (d) divalent radicals of the formula (IV)

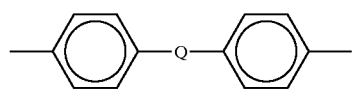

(IV)

wherein Q is a divalent moiety selected from the group consisting of —O—, —S—, —C(O)—, —SO$_2$—, C$_y$H$_{2y}$—, and halogenated derivatives thereof, wherein y is an integer from 1 to 5; and a is an integer sufficient to result in a molecular weight of the polyimide being greater than 50,000 Daltons.

7. The method of claim 6, wherein V is selected from the group consisting of the tetravalent aromatic radicals of formula (II):

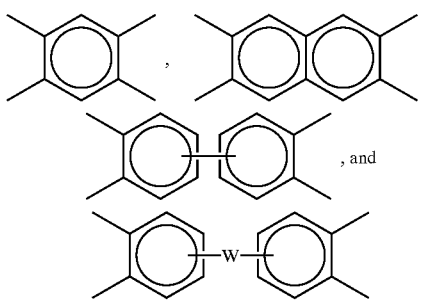

(II)

halogenated derivatives of tetravalent aromatic radicals of formula (II), wherein W is a divalent moiety selected from the group consisting of —O—, —S—, —C(O)—, —SO$_2$—, C$_y$H$_{2y}$—C$_y$F$_{2y}$, wherein y is selected from an integer in the range from 1 to 5, and a group of the formula —O—Z—O— wherein the divalent bonds of the —O— or the —O—Z—O— group are in the 3,3', 3,4', 4,3', or the 4,4' positions, and wherein Z is (III)

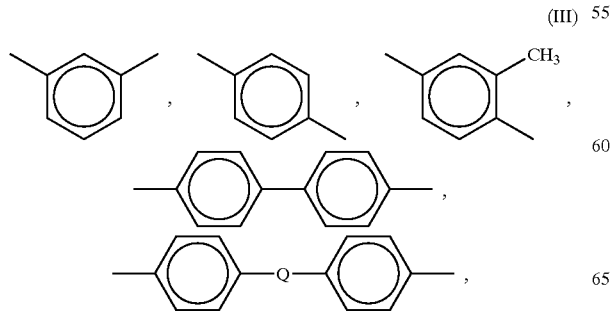

(III)

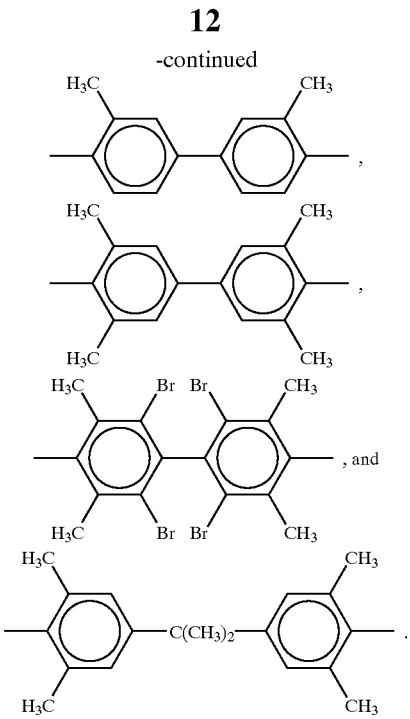

8. The method of claim 1, wherein the high molecular weight poly(imide) comprises structural units of the formula (V)

(V)

wherein T is —O— or a group of the formula —O—Z—O— wherein the divalent bonds of the —O— or the —O—Z—O— group are in the 3,3', 3,4', 4,3', or the 4,4' positions, and wherein Z is selected from the group consisting of divalent radicals of formula one or more of the divalent radicals of formula (III)

(III)

-continued

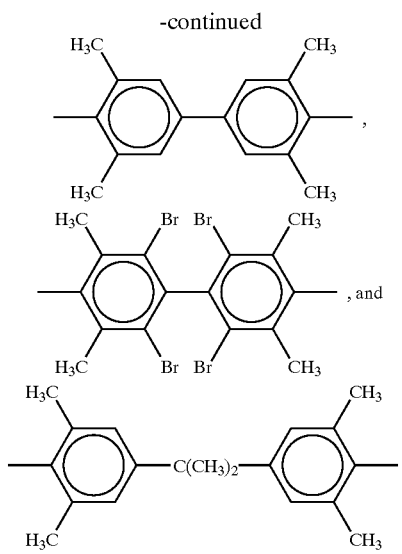

9. The method of claim 1, wherein the high molecular weight poly(imide) comprises polyimide structural units of the formula (VI)

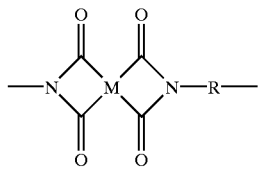

(VI)

wherein R is a substituted or unsubstituted divalent organic radical selected from the group consisting of (a) aromatic hydrocarbon radicals having about 6 to about 20 carbon atoms or halogenated derivatives thereof, (b) straight or branched chain alkylene radicals having about 2 to about 20 carbon atoms, (c) cycloalkylene radicals having about 3 to about 20 carbon atoms, and (d) divalent radicals of the formula (IV)

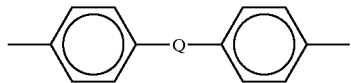

(IV)

wherein Q is a divalent moiety selected from the group consisting of —O—, —S—, —C(O)—, —SO$_2$—, C$_y$H$_{2y}$—, and halogenated derivatives thereof, wherein y is an integer from 1 to 5; and M is one or more of the radicals of formula (VII)

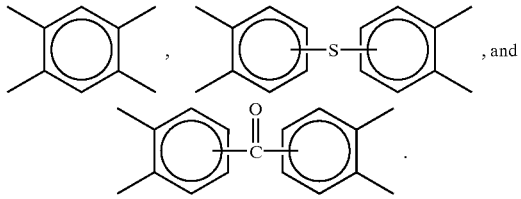

(VII)

10. The method of claim 1, wherein the precursor poly (imide)s are prepared by reaction of 2,2-bis[4-(3,4-dicarboxyphenoxy)phenyl]propane dianhydride, 4,4'-bis (3,4-dicarboxyphenoxy)diphenyl ether dianhydride, 4,4'-bis (3,4-dicarboxyphenoxy) diphenyl sulfide dianhydride, 4,4'-bis(3,4-dicarboxyphenoxy)benzophenone dianhydride, 4,4'-bis(3,4-dicarboxyphenoxy)diphenyl sulfone dianhydride, 2,2-bis[4-(2,3-dicarboxyphenoxy)phenyl]propane dianhydride, 4,4'-bis(2, 3-dicarboxyphenoxy) diphenyl ether dianhydride, 4,4'-bis(2,3-dicarboxyphenoxy)diphenyl sulfide dianhydride, 4,4'-bis(2,3-dicarboxyphenoxy) benzophenone dianhydride, 4,4'-bis(2,3-dicarboxyphenoxy)diphenyl sulfone dianhydride, 4-(2,3-dicarboxyphenoxy)-4'-(3,4-dicarboxyphenoxy)diphenyl-2, 2-propane dianhydride, 4-(2,3-dicarboxyphenoxy)-4'-(3,4-dicarboxyphenoxy)diphenyl ether dianhydride, 4-(2,3-dicarboxyphenoxy)-4'-(3,4-dicarboxyphenoxy)diphenyl sulfide dianhydride, 4-(2,3-dicarboxyphenoxy)-4'-(3,4-dicarboxyphenoxy)benzophenone dianhydride, 4-(2,3-dicarboxyphenoxy)-4'-(3,4-dicarboxyphenoxy)diphenyl sulfone dianhydride, or mixtures thereof, with ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2, 2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylenediamine, 5-methyl-4,6-diethyl-1,3-phenylene-diamine, benzidine, 3,3'-dimethyibenzidine, 3,3' dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(b-amino-t-butyl) toluene, bis(p-b-amino-t-butylphenyl) ether, bis(p-b-methyl-o-amiophenyl) benzene, bis(p-b-methyl-o-aminopentyl) benzene, 1,3-diamino-4-isopropylbenzene, bis(4-aminophenyl) sulfide, bis (4-aminophenyl) sulfone, bis(4-aminophenyl) ether, 1,3-bis (3-aminopropyl) tetramethyldisiloxane, or mixtures thereof.

11. The method of claim 1, wherein the precursor poly (imide)s are prepared by reaction of aromatic dianhydrides selected from the group consisting of fluorinated aromatic dianhydrides, pyromellitic dianhydride, oxydiphthalic anhydride, bisphenol-A dianhydride, and mixtures thereof, with diamines selected from the group consisting of aliphatic diamines hexamethylene diamine, gamma-aminopropyl polydimethylsiloxane, m-phenylenediamine, diethyltoluene diamine, or mixtures thereof.

12. The method of claim 1, wherein the first functional group is an amine and the second functional group is an anhydride, carboxylic acid or acid chloride.

13. The method of claim 1, wherein the first functional group is an ester and the second functional group is an aliphathic amine.

14. The method of claim 1, wherein the first functional group is an electron rich diene and the second functional group is a dienophile.

15. The method of claim 1, wherein the first functional group is an aromatic ring system containing cyclobutane and the second functional group comprises a triple bond.

16. The method of claim 1, wherein the first functional group is an amine and the second functional group is an anhydride.

17. The high molecular weight poly(imide) formed by the method of claim 1.

18. The poly(imide) of claim 17, wherein the weight average molecular weight is greater than about 60,000 Daltons.

19. The high molecular weight poly(imide) of claim 17, wherein the weight average molecular weight is greater than about 80,000 Daltons.

20. The high molecular weight poly(imide) of claim 17, wherein the weight average molecular weight is greater than about 100,000 Daltons.

21. The high molecular weight poly(imide) of claim 17, wherein the weight average molecular weight is greater than about 120,000 Daltons.

22. A method for the synthesis of a high molecular weight poly(imide), comprising: coupling an amine-functionalized precursor poly(imide) having a weight average molecular weight of less than 50,000 Daltons with an anhydride-functionalized precursor poly(imide) having a weight average molecular weight of less than 50,000 Daltons, to provide a poly(imide) having a molecular weight of greater than 50,000 Daltons.

* * * * *